(12) United States Patent
Abbiati et al.

(10) Patent No.: US 9,429,730 B2
(45) Date of Patent: Aug. 30, 2016

(54) METHOD FOR INSTALLING AN OPTICAL FIBRE UNIT IN A TUBE

(75) Inventors: Fabio Abbiati, Milan (IT); Ian James Griffiths, Milan (IT); Arnaud Le Dissez, Milan (IT)

(73) Assignee: PRYSMIAN S.P.A., Milan (IT)

( * ) Notice: Subject to any disclaimer, the term of this patent is extended or adjusted under 35 U.S.C. 154(b) by 1381 days.

(21) Appl. No.: 13/257,244

(22) PCT Filed: Mar. 18, 2009

(86) PCT No.: PCT/EP2009/053187
§ 371 (c)(1),
(2), (4) Date: Dec. 5, 2011

(87) PCT Pub. No.: WO2010/105674
PCT Pub. Date: Sep. 23, 2010

(65) Prior Publication Data
US 2012/0080651 A1    Apr. 5, 2012

(51) Int. Cl.
*G02B 6/44*    (2006.01)
*H02G 1/08*    (2006.01)

(52) U.S. Cl.
CPC ........... *G02B 6/4463* (2013.01); *G02B 6/4465* (2013.01); *G02B 6/4471* (2013.01); *H02G 1/081* (2013.01); *H02G 1/083* (2013.01)

(58) Field of Classification Search
CPC ........ H02G 1/08; H02G 1/088; H02G 1/083; H02G 1/081; H02G 1/04; G02B 6/50; G02B 6/4486; G02B 6/4477; G02B 6/4465; G02B 6/4471; G02B 6/443; G02B 6/4439; G02B 6/3889; G02B 6/3825

USPC ............... 254/134.3 R, 134, 134.5, 134.6, 254/134.3 CL, 134.3 FT, 134.3 PA
See application file for complete search history.

(56) References Cited

U.S. PATENT DOCUMENTS

| 3,672,006 A | * | 6/1972 | Fidrych .................. 24/122.6 |
| 5,133,583 A | | 7/1992 | Wagman et al. |
| 5,480,203 A | | 1/1996 | Favalora et al. |

(Continued)

FOREIGN PATENT DOCUMENTS

DE    90 11 044.7 U1    10/1990
WO    WO 97/03376    1/1997

(Continued)

OTHER PUBLICATIONS

International Search Report from the European Patent Office for International Application No. PCT/EP2009/053187, mailing date Dec. 4, 2009.

*Primary Examiner* — Monica Carter
*Assistant Examiner* — Seahee Yoon
(74) *Attorney, Agent, or Firm* — Finnegan, Henderson, Farabow, Garrett & Dunner, L.L.P.

(57) ABSTRACT

A method for installing an optical fiber unit in a protective tube housing a pulling rope includes the steps of: providing a mini tube having a longitudinal opening from end to end; transversally inserting a portion of the pulling rope in the longitudinal opening; contacting the pulling rope and optical fiber unit over a predetermined length; slipping the mini tube over at least a portion of the contacting length of the pulling rope and optical fiber unit; crimping the mini tube around the pulling rope and optical fiber unit; and drawing the optical fiber unit through the protective tube by pulling the pulling rope.

10 Claims, 3 Drawing Sheets

(56) References Cited

U.S. PATENT DOCUMENTS

| | | | |
|---|---|---|---|
| 6,055,350 A * | 4/2000 | Brown et al. | 385/100 |
| 7,025,509 B2 * | 4/2006 | Martin | 385/86 |
| 7,393,148 B2 * | 7/2008 | Allen et al. | 385/99 |
| 2010/0102286 A1 * | 4/2010 | Jordan et al. | 254/134.3 PA |

FOREIGN PATENT DOCUMENTS

| | | |
|---|---|---|
| WO | WO 99/35525 | 7/1999 |
| WO | WO 2009/016424 A1 | 2/2009 |

* cited by examiner

METHOD FOR INSTALLING AN OPTICAL FIBRE UNIT IN A TUBE

CROSS REFERENCE TO RELATED APPLICATION

This application is a national phase application based on PCT/EP2009/053187, filed Mar. 18, 2009, the content of which is incorporated herein by reference.

BACKGROUND OF THE INVENTION (1) Field of the Invention

The present invention relates to a method for installing an optical fibre unit in a tube by a pulling rope, for example for connecting end user premises to a telecommunication network.

(2) Description of the Related Art

As "optical fibre unit" it is meant a single optical fibre, optionally buffered, or a plurality of optical fibres assembled to form a multi-fibre unit, optionally contained in a micromodule.

Telecommunication cabling of a multiuser area (for example a multifloor building or a residential area) can be made by extracting optical fibre units from a cable (for example a riser cable) to reach the end user premises by inserting the fibre unit into a tube, generally already laid in the building. Said tube also serves to protect the optical fibre unit, therefore in the following shall referred to as "protective tube".

A known installation method provides for attaching the optical fibre unit to a pulling rope previously set into the protective tube, as described, for example by WO 97/03376.

The attaching method should be easy to be performed by the installer, and establish a link between optical fibre unit and pulling rope strong enough to withstand the pulling force exerted to drag the optical fibre unit to the end user premise, or to a branching/splicing termination box, through a path possibly comprising sharp bends.

Specifically, WO 97/03376 relates to a method of installing an optical fibre unit in a tube by attaching a pulling member to one end thereof and exerting a pulling force thereon. The pulling member may be attached to fibre unit by a braided sheath, or the pulling member itself is a braided tube. It is necessary that there should be a suitable means for attaching the trailing end of the pulling member to the leading end of the fibre unit. A suitable means of attaching the pulling member to the fibre unit can conveniently be met by a braided sheath. Small diameter braided sheaths are widely available for an entirely unrelated purpose, namely leaders as in fly fishing, and such leaders can be used, without modification, in the method. The ends of the pulling member and optical fibre unit are each inserted in a respective end of the braided sheath. The friction between the pulling member and the sheath and between the fibre unit and the sheath tends to elongate the sheath and thereby cause it to contract and grip the ends. However, friction by itself is not normally sufficient, and additional means, for example a small quantity of adhesive, preferably a rapidly setting adhesive such as a cyanoacrylate, may be used to ensure an adequate grip. Fly fishing leaders are also available as individual sheaths which have one open end and one end formed into a loop. Such leaders are particularly convenient in conjunction with fibre units which have one or more threads of Kevlar or other material therein. The pulling member can be inserted into the open end, and the Kevlar can be tied to the loop.

Also the method taught by WO 99/35525 implies the use of an adhesive material. In particular, WO 99/35525 discloses a method of inserting a light transmitting member into a tube, the method comprising: inserting an elongate, flexible, tensile member into the tube; attaching the tensile member adjacent a rearward end thereof to the light transmitting member adjacent a forward end thereof; introducing the forward end of the light transmitting member into the tube; and causing flow of fluid along the tube to cause the tensile member and light transmitting member to move into the tube. In order to form a joint between the pull cord and the optical fibre, a needle-like tube is pushed inside the end of the pull cord. The tube is pushed out through the side of the pull cord and the end of the optical fibre is then pushed fully into the tube. The tube is then removed leaving the end of the optical fibre in place inside the pull cord. The end of the optical fibre is then pulled until it is just fully inside the pull cord, and glue is applied to the pull cord.

The Applicant experienced that attaching methods using adhesive material for establishing the pulling rope/fibre unit link are not pleased by the installers in view of the possible dirt.

Another method for attaching the optical fibre unit to a pulling rope employs a little tube, generally in deformable metal, having a diameter slightly greater than that of the optical fibre unit to be attached and a length of about 5-10 mm. First, the pulling rope is threaded into the little tube, then the optical fibre unit is inserted into tube (and into the pulling rope, when the pulling rope is in form of a braided sheath), finally the tube is crimped on the optical fibre unit. Such method suffers some drawbacks: in particular, the threading of the pulling rope inside the tube is difficult and requires manual skill to the operator, possibly with the aid of practical tricks such as the moistening to squeeze it in a thinner shape, for example when the rope is in form of a braided sheath; moreover, crimping a round object (the little tube) around another round object (the optical fibre unit when it is a single optical fibre or a plurality of optical fibres housed in a micromodule) can result in poor linking of the pulling rope to the optical fibre unit or may require the use of special pincers in order to provide a coupling strong enough to allow the optical fibre unit pulling through the tube.

SUMMARY OF THE INVENTION

The Applicant found that the process of inserting an optical fibre unit into a tube by coupling the optical fibre unit to a pulling rope and pulling the optical fibre unit through the tube can be made faster and more reliable by attaching the optical fibre unit to the pulling rope by means of an open mini tube. As "open tube" it is meant a tube having a longitudinal cut or opening, defining an open cross-section (e.g. a "C" shaped cross section).

By "mini tube" it is meant a tube of small size compared to the size of the tube intended for housing the optical fibre unit, so that it can be drawn therethough without finding substantial obstacles.

Thanks to the longitudinal cut of the mini tube the step of inserting the pulling rope becomes very fast and substantially requires no manual skill. Moreover, the crimping of mini tube onto the optical fibre unit can be performed with all-purpose pincers, by squeezing the open mini tube up to close the opening.

Therefore, the present invention relates to a method for installing an optical fibre unit in a protective tube housing a pulling rope, comprising the steps of:

providing a mini tube having a longitudinal opening from end to end;

transversally inserting a portion of the pulling rope in said longitudinal opening;

contacting the pulling rope and optical fibre unit over a predetermined length;

slipping the mini tube over at least a portion of the contacting length of the pulling rope and optical fibre unit;

crimping the mini tube around the pulling rope and optical fibre unit;

drawing the optical fibre unit through the protective tube by pulling the pulling rope.

Preferably, the step of inserting a portion of the pulling rope in said longitudinal opening of the mini tube is made before contacting the pulling rope and optical fibre unit. Alternatively, the step of inserting a portion of the pulling rope in said longitudinal opening of the mini tube is made after contacting the pulling rope and optical fibre unit.

In the present description and claims as "optical fibre unit" it is meant a single optical fibre, optionally buffered, or a plurality of optical fibres assembled to form a multi-fibre unit, optionally contained in a micromodule (i.e. a thin tube loosely or tightly housing the optical fibres).

An optical fibre generally comprises a core surrounded by a cladding, said core and cladding being preferably made of glass, and at least one coating, usually two coatings. The combination of core and cladding is usually identified as "optical waveguide". The coating directly contacting the optical waveguide is called "first coating" or "primary coating", and the coating overlying the first one is called "second coating" or "secondary coating". Typically, said first and second coatings are made of a polymeric material, such as a UV-curable acrylate polymer.

Certain applications require the optical fibre to be further coated by a buffer coating provided over the at least one coating.

When said buffer coating is provided substantially in contact with the at least one exterior coating it is said to be a "tight buffer" coating or layer. The tight buffer layer preferably has a thickness such as to provide a buffered optical fibre with a diameter of from 600 to 1000 μm, more preferably from 800 to 900 μm.

In a preferred embodiment, the optical fibre unit is one or two buffered optical fibres.

The protective tube is typically a tube already present in the building or area where the end user is located. Preferably, the protective tube is made of a plastic material, more preferably halogen free, low smoke plastic material.

Advantageously, the pulling rope is in form of a sheath, for example a braided sheath. In this case, the step of contacting pulling rope and optical fibre unit essentially consists in inserting the optical fibre unit into the pulling rope. Such an embodiment ensures a safer link between optical fibre unit and pulling rope, making the ensemble more resistant to the pulling force exerted to bring the optical fibre unit to the user premises.

Preferably, the mini tube is at least partially made of metal, preferably a deformable metal such as brass or aluminum.

The inner diameter of the open mini tube of the present invention has a value depending on the outer diameter of the optical fibre unit. In the case the optical fibre unit is a plurality of optical fibres, as "outer diameter" is meant the diameter of the envelope encircling the plurality of optical fibres.

In particular, the inner diameter of the mini tube can be from 10% smaller to at least 10% greater than the outer diameter of the optical fibre unit.

In case the inner diameter of the mini tube is smaller than the outer diameter of the optical fibre unit, the insertion of the optical fibre unit is obtained by elastically deforming the mini tube and thanks to the capability of the optical fibre unit to be squeezed, particularly in case of buffered optical fibres.

The higher limit to the inner diameter size of the mini tube is to be selected so that when the mini tube is crimped on the pulling rope/optical fibre unit assembly, a grip is exerted onto pulling rope/optical fibre unit strong enough to resist the pulling force exerted to bring the optical fibre unit to the user premises.

The mini tube should have an inner diameter big enough to provide an anchoring surface sufficient for at least partially embracing the pulling rope/optical fibre unit assembly but not so big that when the tube is crimped the exceeding material creates difficulties to the pulling operations.

The strength of the grip is given by the crimping tool (hand, pliers, pliers with special slots).

The longitudinal opening of the mini tube of the invention can have a width of at least 0.5 mm, preferably of from 0.5 to 1.5 mm. Advantageously, the width of the longitudinal opening is not greater than the inner diameter of the mini tube.

The step of crimping the mini tube can be performed with common pincers or the like. In the case the material of the mini tube is sufficiently soft, the crimping can be hand made at least in part, being preferably completed by pincers or the like to ensure the required grip on pulling rope/optical fibre.

Preferably, the step of contacting pulling rope and optical fibre unit precedes the step of transversally inserting a portion of the pulling rope in the longitudinal opening of the mini tube. This is because during the contacting step a mini tube already present on the pulling rope could fall down from the insertion.

BRIEF DESCRIPTION OF THE DRAWINGS

Further details are provided in the following description of some exemplary embodiments of the invention, with reference to the attached figures, wherein.

DETAILED DESCRIPTION OF THE INVENTION

According one embodiment of the present invention, an optical fibre unit can be attached to a pulling rope as shows in FIGS. 1*a-e*.

Figure 1A:
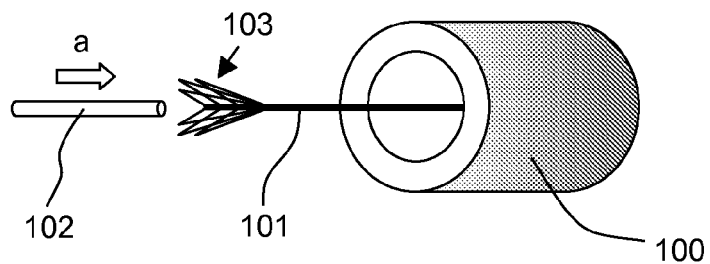
FIGS. 1*a-e* illustrate some steps of the installation of an optical fibre unit according to the method of the invention.

As from FIG. 1*a*, a protective tube 100, installed in a building to reach the end user premises, contains a pulling rope 101. In the present embodiment, the pulling rope 101 is in the form of a braided sheath, according to a preferred embodiment of the invention. Typically, the protective tube 100 is made of low friction polymeric material (for example polyvinylchloride) internally smooth finished.

Figure 1B:
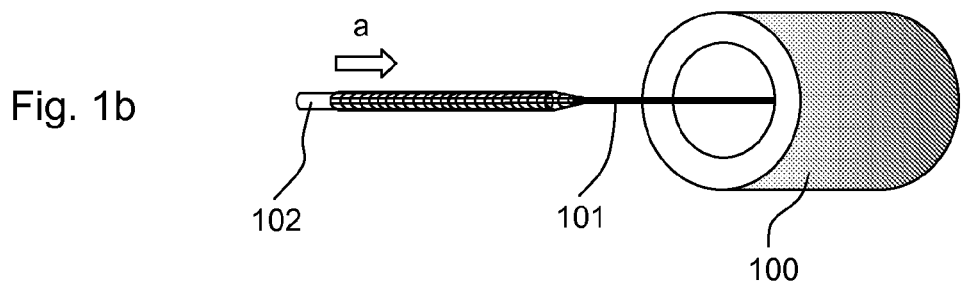

At the end of the pulling rope 101, the braids 103 thereof get loosen to receive a portion of an optical fibre unit 102—in this case, a tight buffered optical fibre —in the direction of the arrow "a", as shown in FIGS. 1a-b.

Figure 1C:
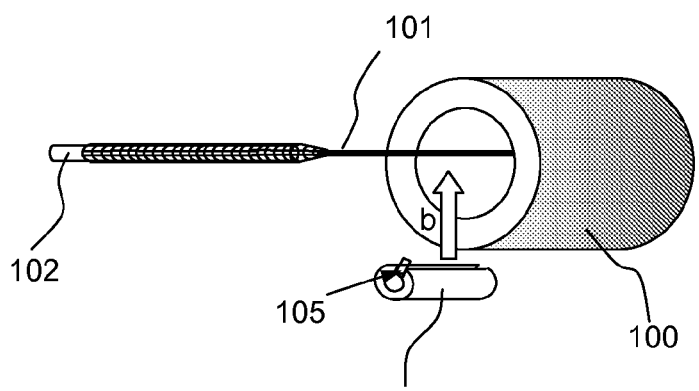

As from FIG. 1c, a mini tube 104 is laterally approached to the pulling rope 101 in the direction of the arrow "b", so that the longitudinal opening 105 of the mini tube 104 faces a length of the pulling rope 101 in a portion where the braids 103 are tight.

Figure 1D:
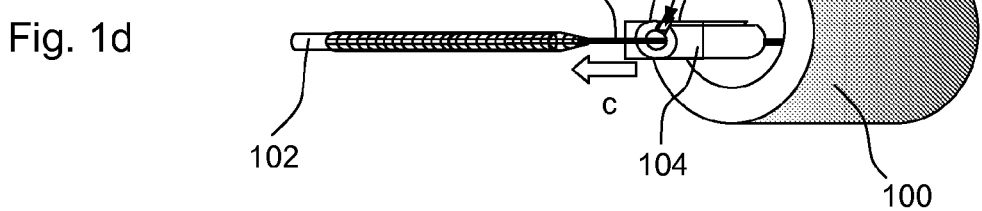
Figure 1E:
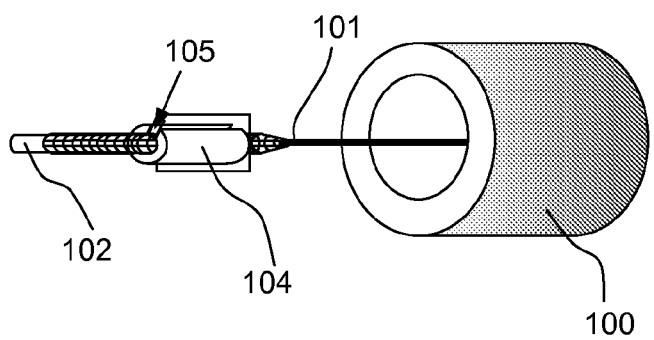

The mini tube 104 is brought onto the pulling rope 101, and then moved in the direction of the arrow "c" to slip on a portion of the pulling rope 101 embracing the optical fibre unit 102 (see FIGS. 1d and 1e).

Once the mini tube 104 reaches a portion of the pulling rope 101 embracing the optical fibre unit 102, it is crimped to close the longitudinal opening 105 or at least to reduce the width thereof. The operation of crimping the mini tube 104 can be effected by hand and/or by pincers, the use of pincers being advisable for providing a better grip on pulling rope 101 and optical fibre unit 102.

While the mini tube 104 is being crimped, the optical fibre unit 102 can get squeezed inside the mini tube 104. The possible damage on the optical waveguide derived by the squeezing is of no importance because the portion of optical fibre unit 102 inserted into the pulling rope 101 is cut out before connecting the optical waveguide to the end use premises.

Figure 2:
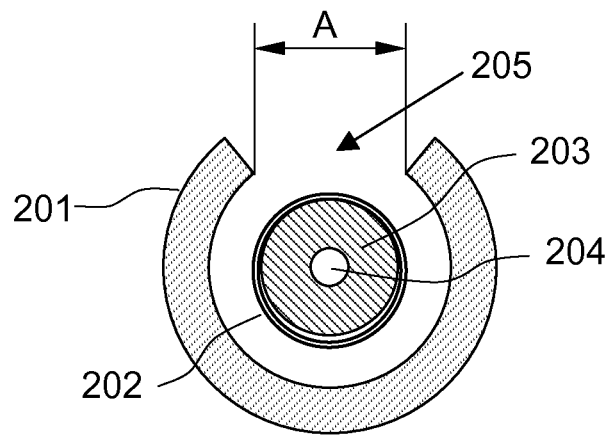
FIG. 2 shows a cross-section view of an optical fibre unit connected to a pulling rope into a mini tube according to the method of invention.

FIG. 2 shows a cross-section view of an optical fibre unit connected to a pulling rope into a mini tube. In particular, an optical fibre unit comprising a coated optical waveguide 204 provided with a tight buffer layer 203 is enveloped in a pulling rope 202 in form of a sheath.

The tight buffer layer can be made of a thermoplastic polymeric material of suitable mechanical properties, such as polyamide or the material as disclosed in WO 09/016424.

Onto the assembly of optical fibre unit 203,204/pulling rope 202, a mini tube 201 is slipped according to the method of the invention.

In preferred present example, the optical fibre unit 203, 204 has an outer diameter of 900 µm; the inner diameter of the mini tube 201 is 1.6 mm; the width "A" of the longitudinal opening 205 is 1 mm.

In another example, a mini tube 201 to be crimped around an optical fibre unit as said above can have an inner diameter of 1 mm and a longitudinal opening 205 with a width "A" of 0.7 mm.

Figure 3:
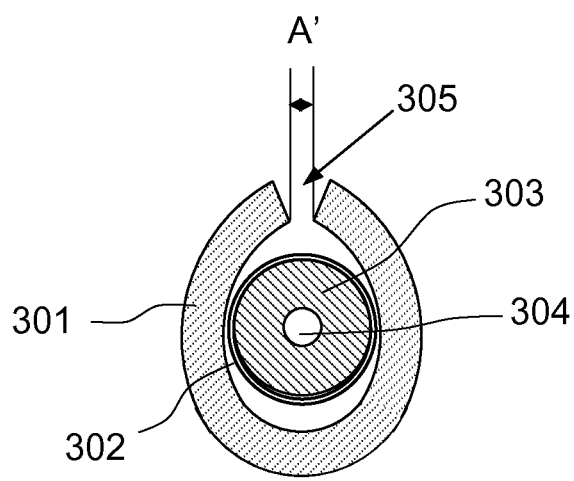
FIG. 3 shows a cross section view of a mini tube gripping an optical fibre unit and a pulling rope according to the method of the invention.

As shown in FIG. 3, the mini tube 301, when crimped, can assume an oval shape—the kind of shape depends on the means used for crimping, for example the pincers slot shape—and the width "A" of the longitudinal opening 305 reduces dramatically. The complete closure of the longitudinal opening 305 is optional because the mere reduction thereof can be sufficient for ensuring the sought grip of the mini tube 301 onto optical fibre unit 303,304 and pulling rope 302.

In view of the deformability of the material of the mini tube, the crimping thereof can be effected by hand, at least to a certain extent and, if needed, finally completed preferably with pincers.

Figure 4:
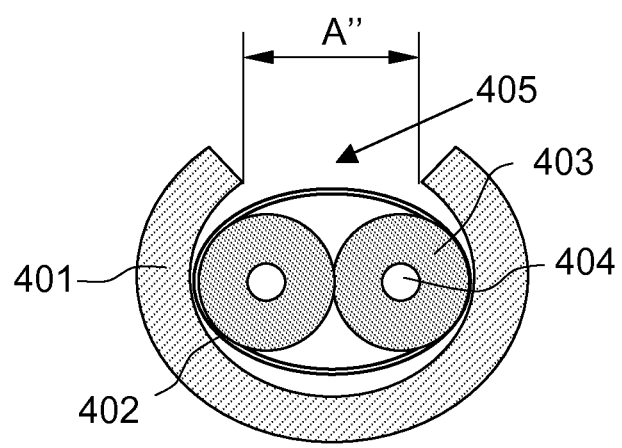
FIG. 4 shows a cross section view of an optical fibre unit connected to a pulling rope into a mini tube according to another embodiment of the method of invention.

FIG. 4 illustrates an example wherein the optical fibre unit consists of two coated optical waveguides 404 provided with tight buffer layer 403, both having an outer diameter of 900 µm, thus the envelope of the optical fibre unit amounts to 1.8 mm.

The internal diameter and the width of the longitudinal opening 405 of the mini tube 404 can be the same as those of the mini tune 204 of FIG. 2, i.e. the inner diameter is 1.6 mm and the width of the longitudinal opening 305 is 1 mm.

While slipping the mini tube 401 onto the portion of the pulling rope 402 embracing the optical fibre unit 403, 404, the mini tube 401 is forced to expand, therefore the inner diameter thereof and the width "A" of the longitudinal opening 305 increase.

Crimping the mini tube 401 can anyway causes the substantial closing of the longitudinal opening because the buffers of optical fibre unit 403, 404 get squeezed.

The invention claimed is:

1. A method for installing an optical fibre unit in a protective tube housing a pulling rope comprising:
    providing a mini tube having a longitudinal opening from end to end;
    transversally inserting a portion of the pulling rope not contacting the optical fibre unit in said longitudinal opening;
    contacting the pulling rope and optical fibre unit over a predetermined length;
    slipping the mini tube from the portion of the pulling rope not contacting the optical fibre unit toward the optical fibre unit over at least a portion of a contacting length of the pulling rope and optical fibre unit;
    crimping the mini tube around the pulling rope and optical fibre unit; and
    drawing the optical fibre unit through the protective tube by pulling the pulling rope.

2. The method according to claim 1, wherein the optical fibre unit is at least one buffered optical fibre.

3. The method according to claim 1, wherein the pulling rope is in a form of a sheath.

4. The method according to claim 3, wherein contacting the pulling rope and optical fibre unit essentially consists in inserting the optical fibre unit into the pulling rope.

5. The method according to claim 1, wherein the mini tube is at least partially made of a deformable metal.

6. The method according to claim 1, wherein the mini tube has an inner diameter 10% smaller to at least 10% greater than an outer diameter of the optical fibre unit.

7. The method according to claim 1, wherein the longitudinal opening of the mini tube has a width of at least 0.5 mm.

8. The method according to claim 1, wherein the longitudinal opening has a width of 0.5 to 1.5 mm.

9. The method according to claim 1, wherein the longitudinal opening has a width not greater than the inner diameter of the mini tube.

10. The method according to claim 1, wherein contacting the pulling rope and optical fibre unit precedes transversally inserting a portion of the pulling rope in the longitudinal opening of the mini tube.

* * * * *